United States Patent
Kramer

(10) Patent No.: US 7,177,926 B2
(45) Date of Patent: Feb. 13, 2007

(54) TRANSMISSION METHOD AND NETWORK GATEWAY DEVICE FOR REAL-TIME COMMUNICATION BETWEEN PACKET-ORIENTED COMMUNICATION NETWORKS

(75) Inventor: Richard Kramer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 864 days.

(21) Appl. No.: 10/259,821

(22) Filed: Sep. 30, 2002

(65) Prior Publication Data

US 2003/0065820 A1   Apr. 3, 2003

(30) Foreign Application Priority Data

Sep. 28, 2001   (DE) ................ 101 47 979

(51) Int. Cl.
G06F 15/13   (2006.01)
(52) U.S. Cl. .............. 709/223; 709/231; 709/246; 707/204
(58) Field of Classification Search ........ 709/223, 709/231, 246; 707/204
See application file for complete search history.

(56) References Cited

U.S. PATENT DOCUMENTS

| 5,805,804 | A * | 9/1998 | Laursen et al. ............ 709/223 |
| 5,813,017 | A * | 9/1998 | Morris ...................... 707/204 |
| 6,397,259 | B1 * | 5/2002 | Lincke et al. ............. 709/236 |
| 6,415,326 | B1 * | 7/2002 | Gupta et al. .............. 709/231 |
| 6,604,106 | B1 * | 8/2003 | Bodin et al. .............. 707/101 |
| 6,708,220 | B1 * | 3/2004 | Olin ......................... 709/247 |
| 2002/0059463 | A1 * | 5/2002 | Goldstein ................. 709/247 |
| 2003/0110296 | A1 * | 6/2003 | Kirsch et al. ............. 709/246 |

FOREIGN PATENT DOCUMENTS

| EP | 0841 831 | 5/1996 |
| WO | 97/38434 | 10/1997 |
| WO | 03/028333 | 4/2003 |

OTHER PUBLICATIONS

ITU-T Recommendation G. 729, "Coding of Speech at 8 kbit/s Using Conjugate-Structure Algebraic-Code-Excited Linear-Prediction (CS-ACELP)", *General Aspects of Digital Transmission Systems*, Geneva, pp. 1-35, 1996, no date.

ITU-T Recommendation G. 723.1, "Dual Rate Speech Coder for Multimedia Communications Transmitting at 5.3 and 6.3 kbit/s", *General Aspects of Digital Transmission Systems*, Geneva, pp. 1-27, 1996, no date.

ITU-T Recommendation G. 711, "Pulse Code Modulation (PCM) of Voice Frequencies", *General Aspects of Digital Transmission Systems*, Geneva, pp. 1-10, 1972, no date.

(Continued)

Primary Examiner—John Follansbee
Assistant Examiner—Jinsong Hu
(74) Attorney, Agent, or Firm—Staas & Halsey LLP

(57) ABSTRACT

In real-time communication between a communication terminal device of a first packet-oriented communication network and a second packet-oriented communication network, data packets which are to be transmitted are transmitted from the communication terminal device in essentially uncompressed form via the first communication network to a data compression device, in order to be compressed before being forwarded into the second communication network.

20 Claims, 2 Drawing Sheets

OTHER PUBLICATIONS

European Search Report of Application No. EP 02 10 2365 dated Aug. 30, 2005.

S. C. Hui et al, "Towards a standards-based Internet telephony system"; Computer Standards and Interfaces Elsevier Sequoia, Lausanne, CH; vol. 19, No. 2, Mar. 1998, pp. 89-103, no date.

J. Chen, "A High-Fidelity Speech and Audio Codec with Low Delay and Low Complexity"; 2000 IEEE International Conference on Acoustics, Speech and Signal Processing, Proceedings, (ICASSP), vol. 2 of 6, Jun. 5, 2000, pp. 1161-1164.

* cited by examiner

TRANSMISSION METHOD AND NETWORK GATEWAY DEVICE FOR REAL-TIME COMMUNICATION BETWEEN PACKET-ORIENTED COMMUNICATION NETWORKS

CROSS REFERENCE TO RELATED APPLICATIONS

This application is based on and hereby claims priority to German Application No. 101 47 979.4 filed on Sep. 28, 2001, the contents of which are hereby incorporated by reference.

BACKGROUND OF THE INVENTION

In present-day communication systems, real-time connections are also increasingly set up, e.g. for voice, video or multimedia communication, via packet-oriented communication networks, such as local area networks (LAN) or wide area networks (WAN). "Internet telephony", for example, also frequently referred to as VoIP telephony (VoIP: Voice/Video over Internet Protocol), is based on this technology.

Known terminal devices for packet-oriented real-time communication normally have a "coder" (codec), e.g. in accordance with ITU-T Recommendations G.729 or G.723.1, which, in real time, compresses the real-time communication data which are to be transmitted and transfers them in the form of data packets into a packet-oriented communication network, normally a local area network. The required transmission bandwidth is reduced by the compression, so that real-time communication connections can also be set up via packet-oriented communication networks with narrow individually available transmission bandwidths, e.g. the Internet.

However, such real-time compression of communication data requires a relatively high processor power which is to be delivered by the terminal device concerned. In the case of a compressing coder in accordance with ITU-T Recommendation G.729, for example, a processor power of 9 MIPS is required. A corresponding specification of the terminal devices is therefore normally relatively costly. In addition, if conventional coders are used, a license fee must frequently be paid for each individual implementation of these coders and thus for each individual terminal device.

SUMMARY OF THE INVENTION

One possible object of the present invention is to indicate a transmission method and a network gateway device for real-time communication between packet-oriented communication networks, whereby the technical outlay required to compress and/or decompress real-time communication data which are to be transmitted is reduced compared with the state of the art.

The transmission method and the network gateway device are essentially used for real-time communication, e.g. of voice, video and/or multimedia communication, between a communication terminal device of a first packet-oriented communication network and a second packet-oriented communication network. The communication terminal device may, for example, be an "IP telephone" (IP: Internet Protocol), a personal computer, an application program or a client application, in each case for packet-oriented voice, video and/or multimedia communication.

Data packets which are to be transmitted in real-time communication are transmitted from the communication terminal device via the first communication network to a data compression device, by which they are compressed and forwarded into the second communication network.

Data packets originating from the second communication network are forwarded to a data decompression device of the first communication network, by which they are decompressed and transmitted via the first communication network to the communication terminal device.

The data compression device and data decompression device may preferably be centrally responsible for the first communication network and/or may be disposed in a network gateway device which is to be inserted between the first and second communication networks for real-time communication between the connected communication networks. The compression may preferably be combined with encryption of the data packets before they are transmitted into the second communication network.

In a typical application, the above method and device provide to be particularly advantageous, the first communication network is designed, for example, as a local area network with a high transmission bandwidth and the second communication network, for example, is designed as a wide area network with relatively meager transmission resources. Since a local area network normally has a very high transmission bandwidth, the additional transmission bandwidth which is required due to essentially uncompressed transmission of the data packets from the communication terminal device to the data compression device can usually be ignored or at least accepted. Following the compression of the data packets, the latter are forwarded into the wide area network where, due to the compression, only a narrow transmission bandwidth is occupied. Due to the compression or decompression of the data packets in a data compression device or data decompression device disposed in the first communication network and preferably in a network gateway device to the second communication network, no costly implementation of a compression or decompression function in each individual communication terminal device of the first communication network is required. The processor power required in a respective communication terminal device is thereby considerably reduced. In addition, if compression methods subject to a license fee are used, a license is no longer required for each individual communication terminal device. The number of required licenses is determined instead by the substantially lower maximum number of real-time communication connections which can be set up simultaneously from the first communication network into an external communication network.

A further advantage is that many communication services, for example conference circuits or speech recognition, process essentially uncompressed communication data and can therefore be incorporated more easily into the first communication network if the communication data is transmitted in essentially uncompressed form therein.

According to an advantageous further development of the invention, a check can be carried out to establish whether the real-time communication is restricted to the first communication network. If so, compression is not carried out.

According to a further advantageous development, a communication data stream which is to be transmitted during the real-time communication can be divided up by the communication terminal device among the data packets in such a way that communication data stream segments inserted into consecutive data packets partially overlap one another. This offers the advantage that a respective data packet with the communication data stream segment inserted therein can be compressed by the data compression device on an individual packet basis, i.e. independently from other data packets, by a prediction compression method. The subsegment of this segment which overlaps a communication data stream segment inserted into a following data packet can be used as a "look-ahead" for the prediction compression method. Modern prediction compression methods enable a very high compression rate, but, in order to compress communication data of a predefined time interval, also require communication data which temporally follow the time interval which is to be compressed. These communication data temporally following the time interval are referred to as a look-ahead or algorithmic look-ahead. On the basis of the overlap of the communication data stream segments contained in the data packets, the overlapping subsegment can be used in each data packet as a look-ahead for the prediction compression method, so that each data packet can be individually compressed without first having to wait for a following data packet due to a required look-ahead. In this way, a delay caused by the compression can be substantially reduced. Such a transport of overlapping communication data stream segments can preferably be provided as a new user data type for the "RTP protocol" (RTP: Real Time Protocol).

As an advantageous further development, it can be provided that the communication data stream is divided up among the data packets in non-overlapping segments, if the real-time communication is restricted to the first communication network.

According to a design variant of the transmission method, a subsegment, transmitted in a respective data packet, of a communication data stream which is to be transmitted during the real-time communication can be allocated to said stream, e.g. can be temporarily stored in the compression device or the network gateway device, so that a corresponding subsegment of a subsequently transmitted data packet can be used as a look-ahead. For this purpose, the temporarily stored subsegment can essentially be positioned so that it immediately precedes the communication data stream segment transmitted in the following data packet. The communication data stream segment composed of the temporarily stored subsegment and the transmitted segment can then be compressed by the data compression device by a prediction compression method, whereby a subsegment of the combined segment can be used as a look-ahead for the prediction compression method. The last-mentioned subsegment can in turn be temporarily stored in order to again precede a further communication data stream segment transmitted in a further data packet. In this way, only the (in practice relatively small) temporarily stored communication data stream subsegment, rather than the entire communication data content of a data packet, is delayed until a following data packet is received.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
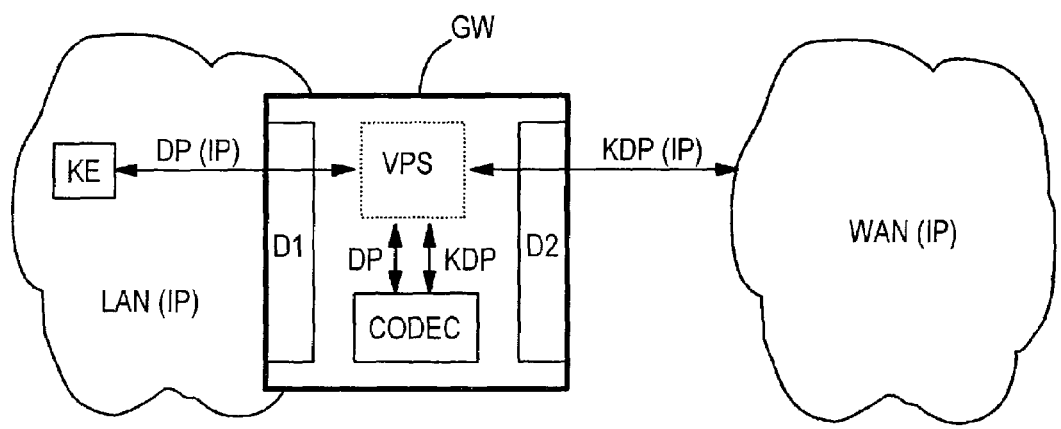
FIG. 1 shows a packet-oriented communication system with two packet-oriented communication networks connected via a gateway, and FIG. 2 and FIG. 3 in each case show a flow chart illustrating a data packet formation.

Reference will now be made in detail to the preferred embodiments of the present invention, examples of which are illustrated in the accompanying drawings, wherein like reference numerals refer to like elements throughout.

FIG. 1 schematically shows a packet-oriented communication system, in which a local area network LAN is connected via a network gateway device designed as a gateway GW to a wide area network WAN, e.g. the Internet, for voice, video and/or multimedia real-time communication. Both the local area network LAN and the wide area network WAN are packet-oriented communication networks, i.e. a respective data transport is based on asynchronously transmitted data packets. In the present embodiment, the data packets are transported in both communication networks LAN and WAN by the "Internet Protocol" IP, onto which higher transmission protocols, e.g. UDP (User Datagram Protocol) or TCP (Transmission Control Protocol) can be overlaid.

The local area network LAN has a communication terminal device KE, which may be designed, for example, as a voice, video or multimedia telephone, as a personal computer, communication application or client application.

The gateway GW has an Internet-Protocol-based data interface D1, via which the local area network LAN is connected, and an Internet-Protocol-based data interface D2, via which the wide area network WAN is connected. Since the communication networks LAN and WAN are logically directly connected to the gateway GW by the same network protocol, in this case IP, at least logically no media interruption detrimental to communication quality occurs in a communication between the communication networks LAN and WAN. In particular, no conversion is required in the transport layer or network layer, as a result of which the architecture of the gateway GW is substantially simplified.

A VoIP-enabled protocol stack VPS (VoIP: Voice/Video over Internet Protocol), e.g. according to ITU-T Recommendation H.323, is furthermore implemented in the gateway GW for real-time communication between the communication networks LAN and WAN. By the protocol stack VPS, the gateway GW can identify data packets which are to be transmitted during real-time communication as such. In particular, the protocol stack VPS enables a decision to be made as to whether data packets are allocated to a voice, video or multimedia real-time connection. Furthermore, the gateway GW has a coder CODEC for compressing and decompressing data packets which are to be transmitted during real-time communication. Here, the coder CODEC uses a compression and decompression method specifically designed for the compression and decompression of real-time communication data, e.g. for voice, video and/or multimedia data. A prediction compression method, e.g. in accordance with ITU-T Recommendation G.729 or G.723.1 is preferably used.

Furthermore, an encryption function for encrypting data packets which are to be transmitted into the wide area network WAN and/or a decryption function for decrypting data packets which are received from the wide area network WAN can be implemented in the coder CODEC.

It is assumed for the present embodiment that a real-time voice connection is routed from the communication terminal device KE via the local area network LAN and the gateway GW into the wide area network WAN.

In this real-time voice connection, a voice data stream which is to be transmitted is divided up by the communication terminal device KE among Internet-Protocol-based data packets DP which are transmitted via the local area network LAN to the gateway GW. The voice data stream transmitted within the data packets DP essentially comprises sampling values, preferably coded in accordance with ITU-T Recommendation G.711, of voice signals which are to be transmitted during the real-time voice connection. The sampling values are transmitted within the data packets DP in uncompressed form from the communication terminal device KE via the local area network LAN to the gateway GW. No computing-intensive compression of the voice data is therefore carried out in the communication terminal device KE.

The uncompressed data packets DP are received by the gateway GW via the data interface D1, and are identified as belonging to the real-time voice connection by the protocol stack VPS. Consequently, the data packets DP are forwarded during their processing by the protocol stack VPS to the coder CODEC, which compresses a user data content of the forwarded data packets DP by a prediction compression method. Conversely, data packets which are not identified as belonging to a real-time communication connection are not forwarded to the coder CODEC, since a small information loss in non-communication data which normally occurs in a prediction compression method is not generally acceptable.

In the present embodiment, the user data content of the data packets DP compressed by the coder CODEC is inserted into Internet-Protocol-based data packets KDP, which are transmitted by the protocol stack VPS via the data interface D2 into the wide area network WAN. The data packets KDP with compressed user data content are also referred to below as compressed data packets KDP. The compressed data packets KDP transmitted into the wide area network WAN can finally be decompressed using a corresponding coder (not shown) and output by a party to the call (not shown) on the communication terminal device KE.

The above descriptions—as indicated in FIG. 1 by double arrows—also apply analogously to transmission of real-time voice data in the opposite direction, i.e. from the wide area network WAN via the gateway GW to the communication terminal device KE. In this case, compressed data packets transmitted from the wide area network WAN to the gateway GW are decompressed by the coder CODEC and are transmitted in uncompressed form via the local area network LAN to the communication terminal device KE. Furthermore, the above descriptions can be generally applied directly to transmissions of other types of real-time communication data, e.g. video data and/or multimedia data.

Relocation of the compression and decompression carried out in the known state of the art in a respective communication terminal device to a coder CODEC disposed in the gateway GW substantially reduces the processor power which is to be delivered by a respective communication terminal device. Furthermore, any licensing costs which may be incurred in the use of coders subject to a license fee are reduced as a result of the smaller number of required coders. Due to the uncompressed transmission of the data packets DP in the local area network LAN, the requirement for transmission bandwidth in the local area network LAN is increased compared to the known state of the art, but this increased requirement is usually negligible in modern, broadband local area networks. In contrast, the bandwidth requirement in the wide area network WAN is minimized due to the compression or decompression which is carried out in the gateway GW.

The prediction compression method used for compression enables a high compression rate and compresses real-time communication data streams with minimal delay. However, in order to compress a predefined segment of a communication data stream, a prediction compression method of this type requires a communication data stream segment which follows the former segment. This following segment is also frequently referred to as a look-ahead or algorithmic look-ahead. Thus, for example in a prediction compression method in accordance with the G.729 Recommendation, for the compression of a 20 ms long communication data stream segment, the 5 ms of the communication data stream following this segment are also required.

In order to avoid always having to wait for a following data packet with look-ahead data in order to compress a respective data packet, different method variants relating to a data packet formation can be provided.

Figure 2:
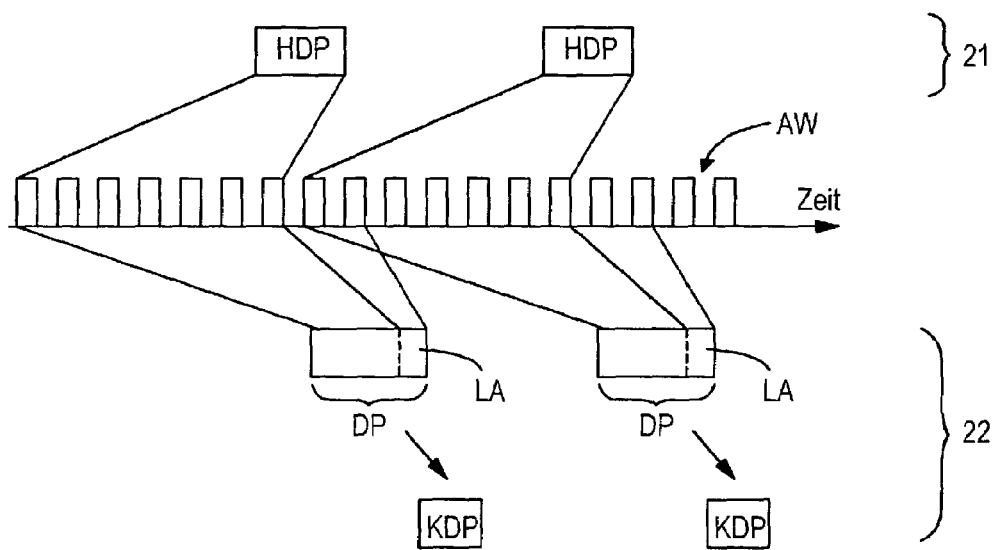

FIG. 2 shows a flow chart illustrating a first packet formation variant according to one aspect of the invention. For comparison, a conventional data packet formation is illustrated in a figure section 21, in which a continuous stream of sampling values AW, e.g. voice sampling values in accordance with ITU-T Recommendation G.711, is divided up by the communication terminal device KE in non-overlapping segments among data packets HDP. In contrast, a figure section 22 illustrates the first packet formation variant, in which a respectively required look-ahead LA is additionally inserted by the communication terminal device KE into each data packet DP. Here, segments of the stream of sampling values AW are divided up by the communication terminal device KE among the data packets DP in such a way that the segments inserted in consecutive data packets DP overlap one another. The subsegment of a respectively considered data packet, which overlaps a segment of a following data packet DP, forms the look-ahead LA which is required for compression for the data packet under consideration. The sampling values AW inserted at the data packet boundaries are thus transmitted in duplicate. A resulting slight increase in the transmission bandwidth is usually negligible, or at least acceptable, due to the high transmission capacities in the local area network LAN. This contrasts with the advantage that the data packets DP containing the look-ahead LA can be compressed by the coder CODEC on an individual packet basis, i.e. independently from other data packets and independently from a connection status, and therefore without further delay, and can be transmitted as compressed data packets DP into the wide area network WAN.

It can preferably be provided that the overlapping transmission of the sampling values AW is carried out by the communication terminal device KE only in real-time communication connections which leave the local area network LAN.

Figure 3:
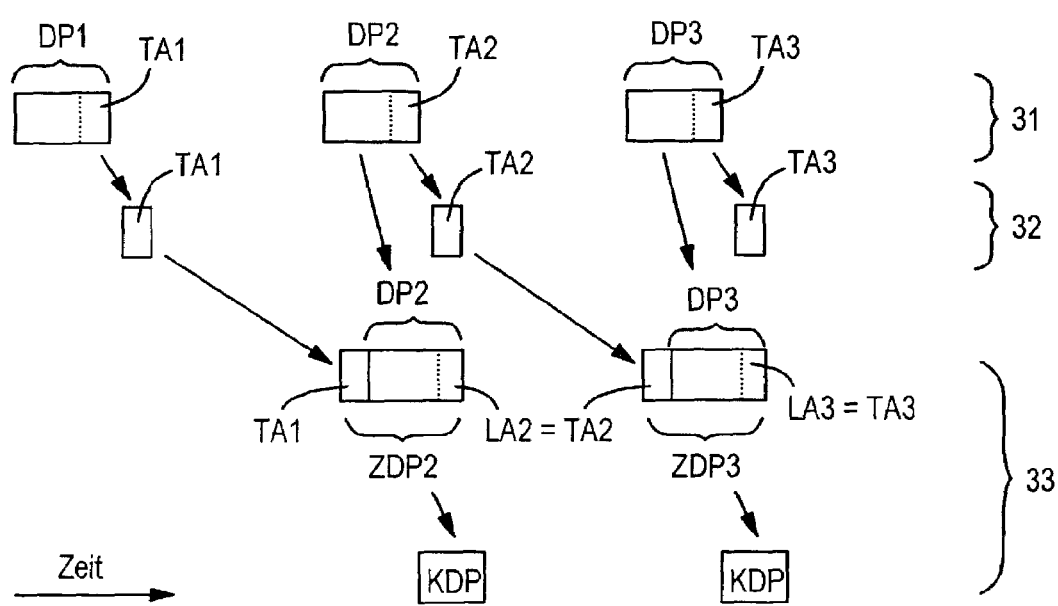

FIG. 3 shows a flow chart illustrating a second packet-formation variant. This second variant is to be preferred if an additional insertion of the look-ahead according to the first method variant is not supported by the communication terminal device KE.

It is assumed below that the coder CODEC uses a prediction compression method in accordance with the G.729 Recommendation, which, in order to compress data packets with a length of 20 ms, requires a look-ahead with a length of 5 ms.

Figure section 31 schematically shows consecutive data packets DP1, DP2, and DP3 with a length of 20 ms, which are filled by the communication terminal device KE with non-overlapping segments of the stream of sampling values AW and are transmitted to the gateway GW. As shown in figure section 32, from each incoming data packet DP1, DP2 or DP3, a subsegment TA1, TA2 or TA3 comprising the last 5 ms of the sampling values AW contained therein is temporarily stored in the gateway GW. The temporarily stored subsegments TA1, TA2 and TA3 are allocated to the communication data stream which is to be transmitted. As is furthermore shown in figure section 33, a respective subsegment TA1 or TA2 is temporarily stored until the respectively following data packet DP2 or DP3 is received, in order to be positioned so that it immediately precedes its respective user data content. (The subsegment TA3 is correspondingly positioned to precede a data packet (not shown) following the data packet DP3.) A combined segment ZDP2 is formed by combining the subsegment TA1 with the user data content of the data packet DP2, and a combined segment ZDP3 is formed by combining the subsegment TA2 with the user data content of the data packet DP3. The length of the combined segments ZDP2 and ZDP3 is in each case 25 ms, so that the last 5 ms of a combined segment ZDP2 or ZDP3 can in each case be used as a look-ahead LA2 or LA3. The combined segments ZDP2 and ZDP3 can therefore be compressed in each case independently of one another and can be transmitted as compressed data packets KDP into the wide area network WAN.

In the second packet-formation variant, the data packets are delayed only by the duration of the required look-ahead. With compression in accordance with the G.729 Recommendation, this delay is only 5 ms.

This delay is substantially less than the delay in a conventional method, in which each data packet is in each case temporarily stored until the following data packet is received, in order to remove the required look-ahead from the following data packet. In this case, the data packets are delayed by the entire duration of one data packet. With compression in accordance with the G.729 Recommendation, this delay is 20 ms.

The invention has been described in detail with particular reference to preferred embodiments thereof and examples, but it will be understood that variations and modifications can be effected within the spirit and scope of the invention.

What is claimed is:

1. A transmission method for data packets in real-time communication between a communication terminal device of a first communication network, and a second communication network, both the first and second communication networks being packet oriented communication networks, comprising:
    transmitting the data packets from the communication terminal device via the first communication network to a data compression device;
    compressing the data packets at the data compression device to thereby produce compressed data packets, the data packets being compressed between the first and second communication networks; and
    forwarding the compressed data packets from the data compression device to the second communication networks,
    wherein the communication terminal device is a voice and/or multimedia real-time communication terminal.

2. The transmission method as claimed in claim 1, wherein the data compression device compresses data packets by a real-time communication data compression method.

3. The transmission method as claimed in claim 2, further comprising:
    checking whether real-time communication is restricted to the first communication network; and
    compressing the data packets only if real-time communication is not restricted to the first communication network.

4. The transmission method as claimed in claim 3, further comprising:
    dividing a real-time communication data stream into adjacent segments, each segment having a subsegment,
    inserting the real-time communication data stream into consecutive data packets that partially overlap one another such that data inserted into a subsegment of a first data packet is also inserted into a second data packet adjacent to, and following, the first data packet.

5. The transmission method as claimed in claim 4, wherein
    data packets with the primary segments inserted therein are compressed by the data compression device on an individual packet basis by a predictive compression method, and
    the subsegments inserted into the data packets are used as a "look-ahead" in the predictive compression method.

6. The transmission method as claimed in claim 3, further comprising:
    dividing a real-time communication data stream into adjacent segments, each segment having a subsegment,
    determining whether a "look-ahead" compression method is supported by the communication terminal device of the first communication network, the "look ahead" data compression method being a predictive data compression,
    if the look-ahead is supported by the communication terminal device, inserting the real-time communication data stream into consecutive data packets that partially overlap one another such that each data packet has a primary segment and a subsegment from a segment adjacent to the primary segment, and
    if the look-ahead is not supported by the communication terminal device, inserting the communication data stream into consecutive data packets that do not overlap one another.

7. The transmission method as claimed in claim 3, further comprising:
    dividing a real-time communication data stream into adjacent segments, each segment having a subsegment,
    temporarily storing a subsegment,
    combining a subsegment so that it immediately precedes a segment transmitted in a following data packet, and
    compressing the communication data stream segment thus combined, by a prediction compression method, whereby the subsegment is used as a "look-ahead" to compress the segment combined therewith.

8. The transmission method as claimed in claim 1, further comprising:
    checking whether real-time communication is restricted to the first communication network; and
    compressing the data packets only if real-time communication is not restricted to the first communication network.

9. The transmission method as claimed in claim 1, further comprising:
    dividing a real-time communication data stream into adjacent segments, each segment having a subsegment,
    inserting the real-time communication data stream into consecutive data packets that partially overlap one another such that data inserted into a subsegment of a first data packet is also inserted into a second data packet adjacent to, and following, the first data packet.

10. The transmission method as claimed in claim 9, wherein data packets with the primary segments inserted therein are compressed by the data compression device on an individual packet basis by a predictive compression method, and the subsegments inserted into the data packets are used as a "look-ahead" in the predictive compression method.

11. The transmission method as claimed in claim 1, further comprising:

dividing a real-time communication data stream into adjacent segments, each segment having a subsegment, determining whether a "look-ahead" data compression method is supported by the communication terminal device of the first communication network, the "look ahead" data compression method being a predictive data compression, If the look-ahead is supported by the communication terminal device, inserting the real-time communication data stream into consecutive data packets that partially overlap one another such that each data packet has a primary segment and a subsegment from a segment adjacent to the primary segment, and if the look-ahead is not supported by the communication terminal device, inserting the communication data stream into consecutive data packets that do not overlap one another.

12. The transmission method as claimed in claim 1, further comprising:

dividing a real-time communication data stream into adjacent segments, each segment having a subsegment, temporarily storing a subsegment, combining a subsegment so that it immediately precedes a segment transmitted in a following data packet, and compressing the communication data stream segment thus combined, by a prediction compression method, whereby the subsegment is used as a "look-ahead" to compress the segment combined therewith.

13. A transmission method according to claim 1, wherein the first packet-oriented communication network is a local area network (LAN) and the second packet-oriented communication network is a wide area network (WAN).

14. A transmission method according to claim 1, wherein the communication terminal is a multi-media telephone.

15. A transmission method for data packets in real-time communication between a communication terminal device of a first communication network and a second communication network, both the first and second communication networks being packet oriented communication networks comprising:

forwarding the data packets originating from the second communication network to a data decompression device of the first communication network, decompressing the data packets in the data decompression device to thereby produce decompressed data packets, the data packets being decompressed between the first and second communication networks, and transmitting the decompressed data packets via the first communication network to the communication terminal devices, wherein the communication terminal device is a voice and/or multimedia real-time communication terminal.

16. A network gateway device through which real time communication data packets pass in traveling between a communication terminal device of a first communication network, and a second communication network, both the first and second communication networks being packet oriented communication networks, comprising:

a first data interface to receive real time communication data packets from the communication terminal device via the first communication network;

a data compression device to receive real time communication data packets from the first data interface and compress the data packets between the first and second communication networks to thereby produce compressed data packets; and a second data interface to pass the compressed data packets from the data compression device to the second communication network, wherein the communication terminal device is a voice and/or multimedia real-time communication terminal.

17. The network gateway device as claimed in claim 16, further comprising an identification unit to identify those data packets which are real-time communication data packets, and to forward the real-time communication data packets to the data compression device.

18. The network gateway device as claimed in claim 17, wherein for at least a portion of the data packets which are not real-time communication data packets, the identification unit bypasses the data compression device.

19. The network gateway device as claimed in claim 16, wherein the data compression device comprises a coder in accordance with ITU-T Recommendation G.729 or G.723.1.

20. The network gateway device as claimed in claim 16, further comprising a data encryption device to encrypt the real-time communication data packets.

* * * * *